US011200146B2

(12) United States Patent
Darke et al.

(10) Patent No.: US 11,200,146 B2
(45) Date of Patent: Dec. 14, 2021

(54) METHOD AND SYSTEM FOR COUNTER EXAMPLE GUIDED LOOP ABSTRACTION REFINEMENT

(71) Applicant: Tata Consultancy Services Limited, Mumbai (IN)

(72) Inventors: Priyanka Darke, Pune (IN); Tanha Shah, Pune (IN); Venkatesh Ramanathan, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/023,594

(22) Filed: Sep. 17, 2020

(65) Prior Publication Data

US 2021/0240594 A1 Aug. 5, 2021

(30) Foreign Application Priority Data

Jan. 31, 2020 (IN) .............................. 202021004385

(51) Int. Cl.
*G06F 9/44* (2018.01)
*G06F 9/445* (2018.01)
*G06F 11/36* (2006.01)

(52) U.S. Cl.
CPC ...... *G06F 11/3608* (2013.01); *G06F 11/3624* (2013.01); *G06F 11/3636* (2013.01); *G06F 11/3664* (2013.01)

(58) Field of Classification Search
CPC ............. G06F 11/3608; G06F 11/3624; G06F 11/3636; G06F 11/3664
See application file for complete search history.

(56) References Cited

U.S. PATENT DOCUMENTS 6,975,976 B1 * 12/2005 Casavant ................ G06F 30/33
703/14
9,158,506 B2 10/2015 Darke et al.
(Continued)

FOREIGN PATENT DOCUMENTS

IN 480/MUM/2012 3/2014

OTHER PUBLICATIONS

Priyanka Darke, Over-approximating loops to prove properties using bounded model checking, 2015, pp. 1407-1412. https://ieeexplore.ieee.org/stamp/stamp.jsp?tp=&arnumber=7092611 (Year: 2015).*

(Continued)

*Primary Examiner* — Mongbao Nguyen
(74) *Attorney, Agent, or Firm* — Finnegan, Henderson, Farabow, Garrett & Dunner LLP (57) ABSTRACT

Software verification is a vital process to ensure reliability and robustness of software systems. The software verification is associated with verifying one or more properties associated with a piece of code. Conventional methods are unable to verify properties of piece of code with loops, especially in the presence of loops with a large, unknown or infinite bound, or a large number of complex conditions. The system receives an abstracted piece of code corresponding to an original piece of code to check whether the abstracted piece of code hence the original piece of code is safe or not. The system applies model checking over the abstracted piece of code to check one or more property assertions associated with an abstracted piece of code. If the property assertion fails in model checking, a trace leading to the violation of the one or more property assertions is identified and analyzed.

9 Claims, 4 Drawing Sheets

(56) References Cited

U.S. PATENT DOCUMENTS

| | | | |
|---|---|---|---|
| 2006/0282807 A1* | 12/2006 | Ivancic | G06F 11/3608 716/106 |
| 2009/0007038 A1 | 1/2009 | Wang et al. | |
| 2009/0292941 A1* | 11/2009 | Ganai | G06F 11/3636 714/2 |
| 2009/0326907 A1* | 12/2009 | Gulwani | G06F 8/49 703/22 |
| 2010/0005454 A1* | 1/2010 | Sankaranarayanan | G06F 11/3608 717/127 |
| 2010/0088548 A1* | 4/2010 | Gulwani | G06F 11/3608 714/38.14 |
| 2010/0169868 A1* | 7/2010 | Condit | G06F 8/437 717/136 |
| 2011/0088016 A1* | 4/2011 | Ball | G06F 8/43 717/128 |
| 2015/0007333 A1* | 1/2015 | Bolignano | G06F 11/3608 726/26 |
| 2015/0154096 A1* | 6/2015 | Sakallah | G06F 30/3323 703/2 |
| 2017/0010949 A1* | 1/2017 | Baumgartner | G06F 11/3604 |
| 2017/0046252 A1* | 2/2017 | Matsubara | G06F 11/3608 |
| 2017/0262356 A1* | 9/2017 | Ramanathan | G06F 11/3608 |

OTHER PUBLICATIONS

Timos Antonopoulos, Specification and Inference of Trace Refinement Relations, 2019, pp. 1-30. https://dl.acm.org/doi/pdf/10.1145/3360604 (Year: 2019).*

Matko Botincan, Refining Existential Properties in Separation Logic Analyses, 2015, pp. 1-19. https://arxiv.org/pdf/1504.08309.pdf (Year: 2015).*

Rocha, Herbert et al., "Model Checking Embedded C Software using k-Induction and Invariants (extended version)", Brazilian Symposium on Computing Systems Engineering (SBESC), 2015, IEEE, https://arxiv.org/pdf/1509.02471.pdf.

Kroening, Daniel et al., "Verification and falsification of programs with loops using predicate abstraction", Formal Aspects of Computing, 2009, pp. 105-128, Springer, https://hal.archives-ouvertes.fr/hal-00534924/document.

* cited by examiner

METHOD AND SYSTEM FOR COUNTER EXAMPLE GUIDED LOOP ABSTRACTION REFINEMENT

PRIORITY CLAIM

This U.S. patent application claims priority under 35 U.S.C. § 119 to: India Application No. 202021004385, filed on Jan. 31, 2020. The entire contents of the aforementioned application are incorporated herein by reference.

TECHNICAL FIELD

The disclosure herein generally relates to the field of software verification and, more particular, to a method and system for counter example guided loop abstraction refinement for verifying properties associated with a piece of code.

BACKGROUND

Software verification is a vital process to ensure reliability and robustness of software systems. The software verification is associated with verifying one or more properties associated with a piece of code.

Conventional methods fail to verify properties of piece of code with loops, especially in the presence of loops with a large, unknown or infinite bound, or a large number of complex conditions. Further, the conventional methods lack either precision or scalability. In order to overcome the problem of precision, some techniques like Bounded Model Checking (BMC) are used. However, the BMC is unable to prove properties of the piece of code if the piece of code is having loops with large, unknown or infinite bounds. Further LABMC (Loop Abstraction followed by Bounded Model Checking) applies loop abstraction but may not be able to verify a property and produce a spurious counter-example. Further in LABMC, refinement by K-induction with iterative deepening may not be able to prove the property assertions if the iterative deepening required is very large.

SUMMARY

Embodiments of the present disclosure present technological improvements as solutions to one or more of the above-mentioned technical problems recognized by the inventors in conventional systems. For example, in one embodiment, a method for counter example guided loop abstraction refinement is provided. The method includes receiving an abstracted piece of code corresponding to an original piece of code, wherein the abstracted piece of code comprises a plurality of base cases and inductive steps, wherein the inductive steps corresponds to a plurality of abstracted loops associated with the abstracted piece of code, and wherein each of the plurality of base cases and inductive steps are associated with a first set of property assertions to be verified. Furthermore, the method includes simultaneously performing a bounded model checking on the abstracted piece of code to verify a property assertion from the first set of property assertions corresponding to a base case from the plurality of base cases and inductive steps, wherein the abstracted piece of code is safe when the property assertion holds for the base case and inductive steps. Finally, the method includes refining the abstracted piece of code when the abstracted piece of code is unsafe corresponding to the inductive steps until all causes leading to violation of a plurality of property assertions are analyzed, the steps of refining includes (i) obtaining an error trace in the abstraction using bounded model checking, wherein the error trace comprises a violation causing path corresponding to the property assertion from the first set of property assertions in the abstraction (ii) checking validity of the error trace on the original piece of code by utilizing a verification technique to obtain one of a valid error trace and an invalid error trace (iii) identifying a plurality of trace conditions, corresponding to the body of the plurality of abstracted loops by using the error trace, when the invalid error trace is obtained, wherein the plurality of trace conditions comprises a subset of conditions evaluated to true in the error trace (iv) negating the plurality of trace conditions to obtain a second set of property assertions (v) obtaining the plurality of property assertions by performing a union of the first set of property assertions and one or more property assertions from the second set of property assertions (vi) further refining of the abstraction based on the plurality of property assertions by annotating the property assertions into the original piece of code and applying loop abstraction using induction to obtain a refined abstracted piece of code (vii) bounded model checking of the refined abstracted piece of code to check whether the piece of code is safe.

In another aspect, a system for counter example guided loop abstraction refinement is provided. The system includes at least one memory storing programmed instructions, one or more Input/Output (I/O) interfaces, and one or more hardware processors operatively coupled to the at least one memory, wherein the one or more hardware processors are configured by the programmed instructions to receive an abstracted piece of code corresponding to an original piece of code, wherein the abstracted piece of code comprises a plurality of base cases and inductive steps, wherein the inductive steps corresponds to a plurality of abstracted loops associated with the abstracted piece of code, and wherein each of the plurality of base cases and inductive steps are associated with a first set of property assertions to be verified. Furthermore, the one or more hardware processors are configured by the programmed instructions to simultaneously perform a bounded model checking on the abstracted piece of code to verify a property assertion from the first set of property assertions corresponding to a base case from the plurality of base cases and inductive steps, wherein the abstracted piece of code is safe when the property assertion holds for the base case and inductive steps. Finally, the one or more hardware processors are configured by the programmed instructions to refine the abstracted piece of code when the abstracted piece of code is unsafe corresponding to the inductive steps until all causes leading to violation of a plurality of property assertions are analyzed, the steps of refining includes (i) obtaining an error trace in the abstraction using bounded model checking, wherein the error trace comprises a violation causing path corresponding to the property assertion from the first set of property assertions in the abstraction (ii) checking validity of the error trace on the original piece of code by utilizing a verification technique to obtain one of a valid error trace and an invalid error trace (iii) identifying a plurality of trace conditions, corresponding to the body of the plurality of abstracted loops by using the error trace, when the invalid error trace is obtained, wherein the plurality of trace conditions comprises a subset of conditions evaluated to true in the error trace (iv) negating the plurality of trace conditions to obtain a second set of property assertions (v) obtaining the plurality of property assertions by performing a union of the first set of property assertions and one or more property assertions from the second set of property assertions (vi)

further refining of the abstraction based on the plurality of property assertions by annotating the property assertions into the original piece of code and applying loop abstraction using induction to obtain a refined abstracted piece of code (vii) bounded model checking of the refined abstracted piece of code to check whether the piece of code is safe.

In yet another aspect, a computer program product including a non-transitory computer-readable medium having embodied therein a computer program for method and system for counter example guided loop abstraction refinement is provided. The computer readable program, when executed on a computing device, causes the computing device to receive an abstracted piece of code corresponding to an original piece of code, wherein the abstracted piece of code comprises a plurality of base cases and inductive steps, wherein the inductive steps corresponds to a plurality of abstracted loops associated with the abstracted piece of code, and wherein each of the plurality of base cases and inductive steps are associated with a first set of property assertions to be verified. Furthermore, the computer readable program, when executed on a computing device, causes the computing device to simultaneously perform a bounded model checking on the abstracted piece of code to verify a property assertion from the first set of property assertions corresponding to a base case from the plurality of base cases and inductive steps, wherein the abstracted piece of code is safe when the property assertion holds for the base case and inductive steps. Finally, the computer readable program, when executed on a computing device, causes the computing device to refine the abstracted piece of code when the abstracted piece of code is unsafe corresponding to the inductive steps until all causes leading to violation of a plurality of property assertions are analyzed, the steps of refining includes (i) obtaining an error trace in the abstraction using bounded model checking, wherein the error trace comprises a violation causing path corresponding to the property assertion from the first set of property assertions in the abstraction (ii) checking validity of the error trace on the original piece of code by utilizing a verification technique to obtain one of a valid error trace and an invalid error trace (iii) identifying a plurality of trace conditions, corresponding to the body of the plurality of abstracted loops by using the error trace, when the invalid error trace is obtained, wherein the plurality of trace conditions comprises a subset of conditions evaluated to true in the error trace (iv) negating the plurality of trace conditions to obtain a second set of property assertions (v) obtaining the plurality of property assertions by performing a union of the first set of property assertions and one or more property assertions from the second set of property assertions (vi) further refining of the abstraction based on the plurality of property assertions by annotating the property assertions into the original piece of code and applying loop abstraction using induction to obtain a refined abstracted piece of code (vii) bounded model checking of the refined abstracted piece of code to check whether the piece of code is safe.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments herein provide a method and system for counter example guided loop abstraction refinement to verify a plurality of properties associated with a piece of code. The method for counter example guided loop abstraction refinement receives an abstracted piece of code corresponding to an original piece of code and checks whether the abstracted piece of code is safe. If the abstracted piece of code is safe, then the original piece of code is safe. Abstraction is the act of representing essential features without including background details or explanation to reduce complexity and allow efficient implementation of a complex piece of code, herein the original piece of code. The abstracted piece of code is derived from the original piece of code in a way that the outputs it generates include all possible outputs of the original piece of code, thus the abstracted piece of code is an over approximation of the original piece of code. The method applies model checking (for example, Bounded Model Checking (BMC)) over the abstracted piece of code to check one or more property assertions associated with the abstracted piece of code. The abstracted piece of code may include abstracted loops. Some loops may be abstracted using induction and some may not be abstracted using induction. For the loops which are not abstracted using induction, if a property assertion is identified to fail by BMC, then the property assertions may fail in the original program as well and hence refinement is applied to the abstraction. Further a trace leading to the violation of the one or more property assertions is identified and analyzed. For the loops which are abstracted using induction, if the loop includes a base case and an inductive step corresponding to the abstracted loop, then the one or more property assertions can be proven in the base case of the abstracted piece of code. However, if the properties fail in the inductive step, the abstracted piece of code is unsafe, hence the original piece of code too may be unsafe. Hence, a trace leading to the violation of the one or more property assertions is identified and further analyzed.

Referring now to the drawings, and more particularly to FIG. 1 through 3B, where similar reference characters denote corresponding features consistently throughout the figures, there are shown preferred embodiments and these embodiments are described in the context of the following exemplary system and/or method.

Figure 1:
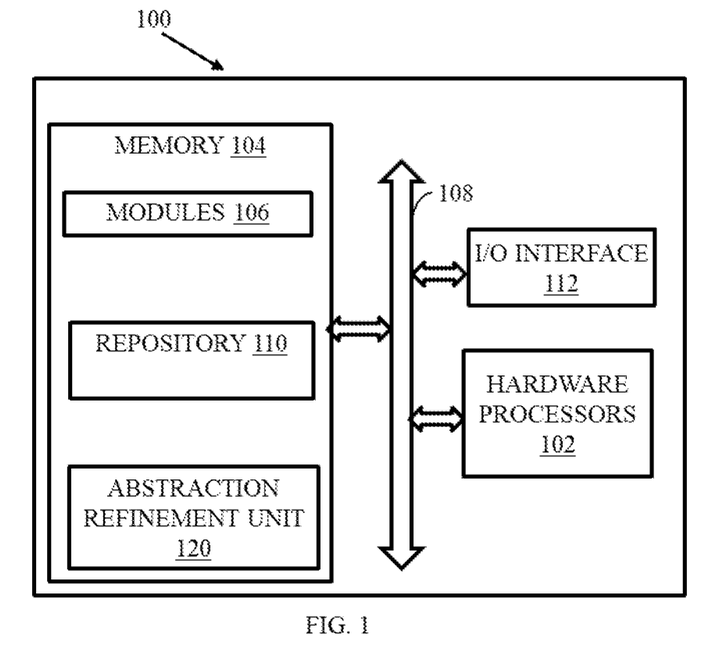
FIG. 1 is a functional block diagram of a system for counter example guided loop abstraction refinement, according to some embodiments of the present disclosure.

FIG. 1 is a functional block diagram of a system 100 for counter example guided loop abstraction refinement, according to some embodiments of the present disclosure. A counter example is an example that shows the invalidity or failure of any of the given property assertions. The counter example guided loop abstraction refinement refines the abstracted loop in the abstracted piece of code by using counter examples. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the interface 112 may enable the system 100 to communicate with other devices, such as web servers and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting a number of computing systems with one another or to another server computer. The I/O interface 112 may include one or more ports for connecting a number of devices to one another or to another server.

The one or more hardware processors 102 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and an abstraction refinement unit 120. The memory 104 also includes a data repository 110 for storing data processed, received, and generated by the plurality of modules 106 and the abstraction refinement unit 120. The plurality of modules 106 may include routines, programs, objects, components, data structures, and so on, which perform particular tasks or implement particular abstract data types.

The plurality of module 106 include programs or coded instructions that supplement applications or functions performed by the system 100 for counter example guided loop abstraction refinement. The plurality of modules 106, amongst other things, can include routines, programs, objects, components, and data structures, which perform particular tasks or implement particular abstract data types.

The modules 106 may also be used as, signal processor(s), state machine(s), logic circuitries, and/or any other device or component that manipulates signals based on operational instructions. Further, the modules 106 can be used by hardware, by computer-readable instructions executed by a processing unit, or by a combination thereof. The modules 106 can include various sub-modules (not shown). The modules 106 may include computer-readable instructions that supplement applications or functions performed by the system 100 for counter example guided loop abstraction refinement.

The data repository 110 may include a plurality of abstracted piece of code for refinement. and data that is processed, received, or generated as a result of the execution of the plurality of modules in the module(s) 106 and the modules associated with the abstraction refinement unit 120.

Although the data repository 110 is shown internal to the system 100, it will be noted that, in alternate embodiments, the repository 110 can also be implemented external to the computing device 100, where the repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

In an embodiment, the abstraction refinement unit 120 of the system 100 for counter example guided loop abstraction refinement includes a plurality of modules (not shown) including a loop abstraction module, checking module and a refinement module Loop abstraction module: Generates abstract programs by abstracting the loops of an input piece of code and over-approximating the variables modified in the loop body.

Checking module: Receives abstracted program(s) generated by the loop abstraction or refinement module as the input. Initially, the checker module executes a model checker like BMC on the abstracted piece of code from the loop abstraction or the refinement module. If the abstraction includes the base case program, the checker module checks whether the input property assertion is safe with respect to the base case. If the input property assertion is violated in the base case check, the program may be unsafe with respect to the input property and the checker module generates the verification result and exits. Otherwise if the base case is safe, it applies BMC on the inductive step of the piece of code. If the input property does not hold, a trace is produced by the (bounded) model checker with respect to that property. The words "program" and "piece of code" are used interchangeably throughout the document.

Refinement module: If the trace is produced by the model checker with respect to any property in the abstraction, the refinement module identifies the cause of violation based on the counter-example trace. Further, the refinement module generates or refines the base case program, and inductive step program by elimination of the cause of assertion failure in the counter example trace path. The refined program is further given as input to the checker module. Further, base and induction checks are performed on the refined program. The cycle continues until no further causes leading to violation of any property in the induction check are identified.

The abstraction refinement unit 120, executed by the one or more processors of the system 100, receives the abstracted piece of code corresponding to the original piece of code. The abstracted piece of code may include a plurality of base cases and inductive steps. The inductive steps corresponds to the plurality of abstracted loops associated with the abstracted piece of code. The abstracted piece of code is associated with a first set of property assertions to be verified.

Example code 1 illustrates an original piece of code and example code 2 illustrates an abstracted base case of the original piece of code given in

```
                Example code 1.
1.              while ( 1 ) {
2.                  if ( c1 ) {
3.                      s1
4.                  }
5.                  if (c2) {
6.                      s2
7.                  }
8.                  assert ( ϕ )
9.              }
```

Here, c1 and c2 are "if" conditions. s1 indicates statements within if condition c1. s2 indicates statements within if condition c2. ϕ indicates a property assertion to be verified. The base case of induction illustrated in the example code 2 is annotated to verify the property ϕ with the initial values of the program variables. The property ϕ can be any condition associated with the piece of code. For example, a<b, b!=0. If ϕ fails, the original program is unsafe with respect to ϕ.

```
                Example code 2
1.              if ( 1 ) {
2.                  if ( c1 ) {
3.                      s1
4.                  }
5.                  if (c2) {
6.                      s2
7.                  }
8.                  assert ( ϕ )
9.              }
```

Further, the abstraction refinement unit 120, executed by one or more processors of the system 100, simultaneously performs the bounded model checking on the abstracted piece of code to verify the property assertion from the first set of property assertions corresponding to the base case from the plurality of base cases and inductive steps. Example code 3 illustrates the inductive step where the infinite loop in the example code 1 is abstracted. IO indicates a set of variables modified and read in the loop body and abstract (IO) indicates a set of assignments that provides non-deterministic or arbitrarily any values to the IO variables of the loop. The property is assumed to be valid for an arbitrary k iterations (Lines 2-9 in the example code 3) of the input loop. If the property ϕ remains valid after one more iteration of the loop body ((k+1)$^{th}$ iteration: Lines 10-15 in the example code 3), by induction, it can be proved that the program is safe corresponding to the property ϕ. Thus, the abstracted piece of code and hence the original piece of code is safe when the property assertion holds for the base case and inductive steps.

```
                Example code 3
1.              if ( 1 ) {
2.                  abstract ( IO )
3.                  if ( c1 ) {
4.                      s1
5.                  }
6.                  If (c2) {
7.                      s2
8.                  }
9.                  assume ( ϕ )
10.                         if ( c1 ) {
11.                             s1
12.                         }
13.                         if (c2) {
14.                             s2
15.                         }
16.                         assert ( ϕ )
17.             }
```

Further, the abstraction refinement unit 120, executed by one or more processors of the system 100, refines the abstracted piece of code when the abstracted piece of code is unsafe corresponding to the inductive steps. The refinement continues until all causes leading to violation of the plurality of property assertions are analyzed. The refinement includes the following steps: (i) obtaining the error trace in the abstraction using BMC, wherein the error trace comprises a violation causing path corresponding to the property assertion from the first set of property assertions in the abstraction (ii) checking validity of the error trace on the original piece of code by utilizing a verification technique to obtain one of a valid error trace and an invalid error trace. The verification technique includes one of a testing technique and a plurality of verification techniques (iii) identifying a plurality of trace conditions, corresponding to the body of the plurality of abstracted loops by using the error trace, when the invalid error trace is obtained, wherein the plurality of trace conditions comprises a subset of conditions evaluated to true in the error trace (iv) negating the plurality of trace conditions to obtain a second set of property assertions (v) obtaining the plurality of property assertions by performing a union of the first set of property assertions and one or more property assertions from the second set of property assertions (vi) further refining of the abstraction based on the plurality of property assertions by annotating the property assertions into the original piece of code and applying loop abstraction using induction to obtain a refined abstracted piece of code and (vii) bounded model checking of the refined abstracted piece of code to check whether the piece of code is safe. The refinement process is performed iteratively until the property assertions are proved to be safe, or the base case fails, or the error trace is found to be valid (in which case an error in the code is found), or the technique runs out of time or memory.

Example code 4 illustrates the refined base case of the refined abstracted piece of code and example code 5 illustrates the inductive steps associated with the refinement. If the property ϕ remains invalid after one more iteration of the loop body ((k+1)$^{th}$ iteration: Lines 10-15 in the example code 3), the program is unsafe corresponding to the property ϕ. Hence, the base case and inductive step are refined and verified by encoding the causes of violation of property as unreachability constraints. For instance, if c1 is the cause of violation of ϕ in the example code 1, the base case and inductive step are refined as shown in the example code 4 and the example code 5. This refinement continues until no further causes of violation of properties are identified in the inductive step (example code 5) and hence, the program is verified to be successful. If the refined base case (example code 4) fails corresponding to input property φ, the program is unsafe with respect to φ, or if the error trace is found to be valid then too the program is unsafe corresponding to the given property.

| Example code 4 |
| --- |
| 1.  if ( 1 ) { |
| 2.      assert (!c1) |
| 3.      if ( c1 ) { |
| 4.          s1 |
| 5.      } |
| 6.      if (c2) { |
| 7.          s2 |
| 8.      } |
| 9.      assert ( φ ) |
| 10.     if ( c1 ) { |
| 11.         s1 |
| 12.     } |
| 13.     If (c2) { |
| 14.         s2 |
| 15.     } |
| 16.     assert ( φ ) |
| 17. } |

| Example code 5 |
| --- |
| 1.  if ( 1 ) { |
| 2.      abstract ( IO ) |
| 3.      assume (!c1) |
| 4.      if ( c1 ) { |
| 5.          s1 |
| 6.      } |
| 7.      if (c2) { |
| 8.          s2 |
| 9.      } |
| 10.     assume ( φ ) |
| 11.     assert (!c1) |
| 12.     if ( c1 ) { |
| 13.         s1 |
| 14.     } |
| 15.     If (c2) { |
| 16.         s2 |
| 17.     } |
| 18.     assert ( φ ) |
| 19. } |

The induction technique is applied for verification when at least one of property assertion from the first set of property assertion to be verified lies inside the body of each of the plurality of abstracted loops. Other techniques including Loop abstraction followed by BMC or abstract acceleration or output abstraction techniques are applied for verification, when all of the first set of property assertions to be verified lies outside the body of each of the plurality of abstracted loops.

In an embodiment, to improve the scalability of verification, the present disclosure applies slicing over the input unrolled abstracted loop with respect to the assertions and assumptions associated with the cause of violation or the second set of property assertion identified and the user property assertions. This leads to the different slicing of different loop unrolling. This is the main reason why abstraction refinement technique does not need k+1 but less than k+1 instances of the loop body in the inductive step.

Figure 2:
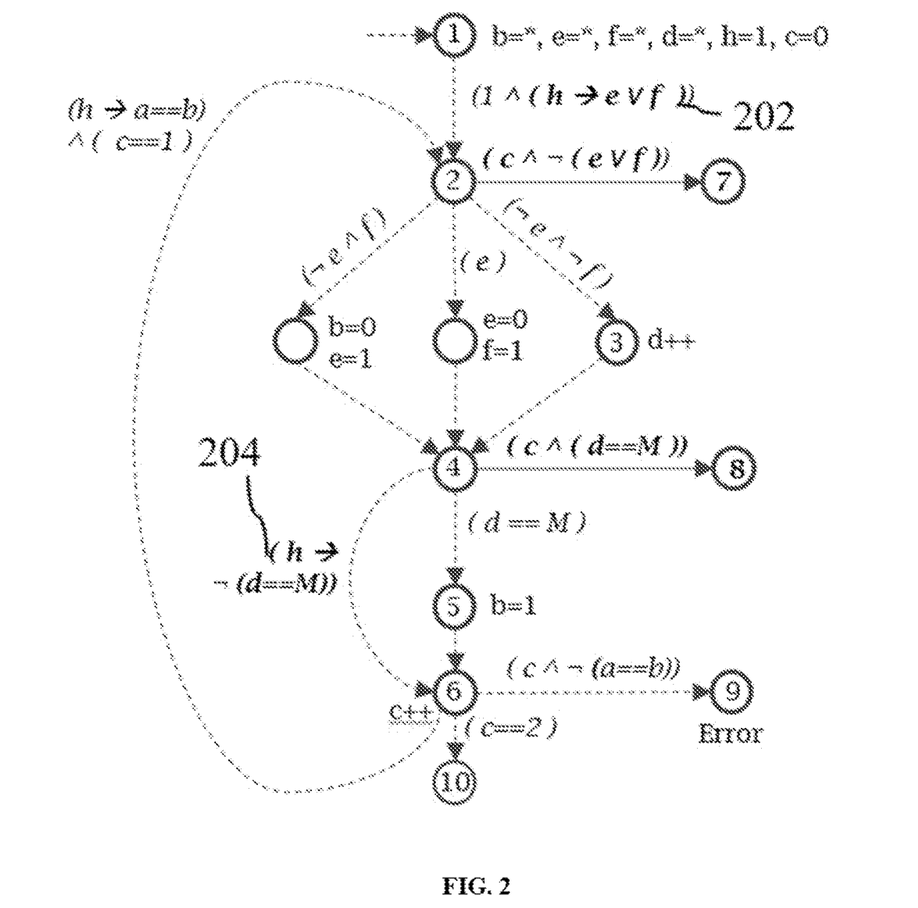
FIG. 2 is a Control Flow Graph (CFG) illustrating an example abstracted loop of the method for counter example guided loop abstraction refinement, according to some embodiments of the present disclosure.

In an embodiment, the inductive steps of the abstracted loop is represented as a Control Flow Graph (CFG), wherein the CFG comprises nodes and edges, wherein the edges represents conditions associated with the piece of code and the nodes represents the corresponding actions. FIG. 2 is the Control Flow Graph (CFG) illustrating an example abstracted loop of the method for counter example guided loop abstraction refinement, according to some embodiments of the present disclosure. The CFG of FIG. 2 is drawn corresponding to an example code 6 given below. The example code given below is safe corresponding to the property assertion at line number 3 since the else statement at line number 6 is unreachable.

| Example code 6 |
| --- |
| 1.  void main( ) |
| 2.  { |
| 3.      int a=0,b=0,d=0, e=1,f=0,M; assume(M > 0); |
| 4.      while(1) |
| 5.          { |
| 6.              if(e) { e=0; f=1; } else if(f) { b=0; e=1; } else d++; |
| 7.              if(d == M) |
| 8.              { |
| 9.                  b = 1; |
| 10.             } assert(a==b); |
| 11.         } |
| 12.     } |

Now, referring FIG. 2, the conditions in the program are represented as edges of the CFG and a plurality actions occurring when the corresponding condition is true are represented as nodes. The CFG is utilized to illustrate two cases: (i) the abstraction with refinement and (ii) the abstraction without refinement. The CFG including all edges and conditions in the FIG. 2 represents the abstraction with refinement and the CFG without the solid edges and conditions in bold represents the abstraction without refinement.

In an embodiment, the abstraction without the refinement is explained as follows: For simplification we havoc the loop outputs b, e, f and d to abstract the loop. The loop in the CFG comprises of two iterations of an enhanced loop body. The first iteration represents the induction hypothesis and the second the inductive check of the inductive step. There are additional variables h and c. The induction hypothesis is modelled and the inductive check is performed using the additional variables respectively. The first iteration of the enhanced loop body represents the hypothesis h==1, and the second iteration of the loop body represents the inductive check c=1. c==2 holds at the end of the inductive step. The assumption corresponding to the input property is added in the hypothesis. Thus in FIG. 2, it is prefixed by 'h_' starting from node 6. The assertion corresponding to the input property is added in the second iteration (inductive check) and is thus prefixed by 'c_∧' leading to node 9. The invalid path leading to the error in the abstraction is 1→ . . . 5→6→2→ . . . 6→9.

In an embodiment, the abstraction with refinement is performed as given below: The plurality of trace conditions (conditionals of the loop body that hold in the counter-example trace) are identified. Here, validity of conditions ($\neg e \wedge \neg f$) and (d==M) lead to the error, so are identified as trace conditions or causes of violation. Further the refiner checks whether the counter-example path is invalid by checking for the invalidity of the respective trace conditions using induction in the abstraction. Accordingly the refinement applies induction over the negation of the trace conditions, and creates assumptions and assertions in the hypothesis and obtains the second set of property assertions. The second set of property assertions (e$\vee$f) and ¬ (d==M) are represented in FIG. 2 as 202 and 204. The inductive step is performed on the second set of property assertions. The failure of the property assertions leads to new failure nodes 7 and 8 via the bold edges. The refinement is proved to be safe by a bounded model checker.

In an embodiment, an algorithm for counter example guided loop abstraction refinement technique is given below:

```
1.      Procedure ceglar(p,C)
2.      A←C;
3.      d ← 0;
4.      (r, t) ← labmc(p, A) ;
5.      if (r == SUCCESS) then return SUCCESS;
6.      while (r == FAIL) do
7.      T ← getNegatedTraceConditions(t) ;
8.      if (T ==∅) then return UNKNOWN;
9.      A ← A+T;
10.     p0 ← abstractLoops(p, A) ;
11.     t ← baseCase(p0, A, d) ;
12.     B ← failedBaseCaseConditions(t) ;
13.     if (B ∈ C) then return FAIL;
14.     A ← A- B;
15.     (r, t) ← inductionStep(p0, A) ;
16.     If (r==SUCCESS) then return SUCCESS;
17.     d←d+1 ;
```

The algorithm for counter example guided loop abstraction refinement technique receive two parameters: the input program p and the set of assertions c provided by the user. LABMC is applied on the program for the given set of assertions, which may generate a trace t and return the verification result in r. If LABMC fails, from the trace t the set of trace conditions T is identified, negated and then added to the initial set of assertions to be checked for. Thus the abstraction is performed again (to apply induction wrt the new set of assertions). First the base case check is performed for an unwinding of d. If any of the initial input assertions fail at this depth, then the program is unsafe, and if any of the new assertions fail, then they are not checked any further since they are reachable. Next the set of failed property assertions (which do not include the user provided assertions) are removed from the set of assertions to be checked. Then inductive step is checked using BMC to return the verification status r and the error trace t if any of the assertions fail. If none of the assertions fail, then the verification is successful and the user provided assertions hold and the given original program is safe corresponding to the given properties. If the properties do not hold, then the depth is increased and the refinement loop continues until the program is proved to be safe or the trace conditions returned are empty or a base case fails.

Figure 3A:
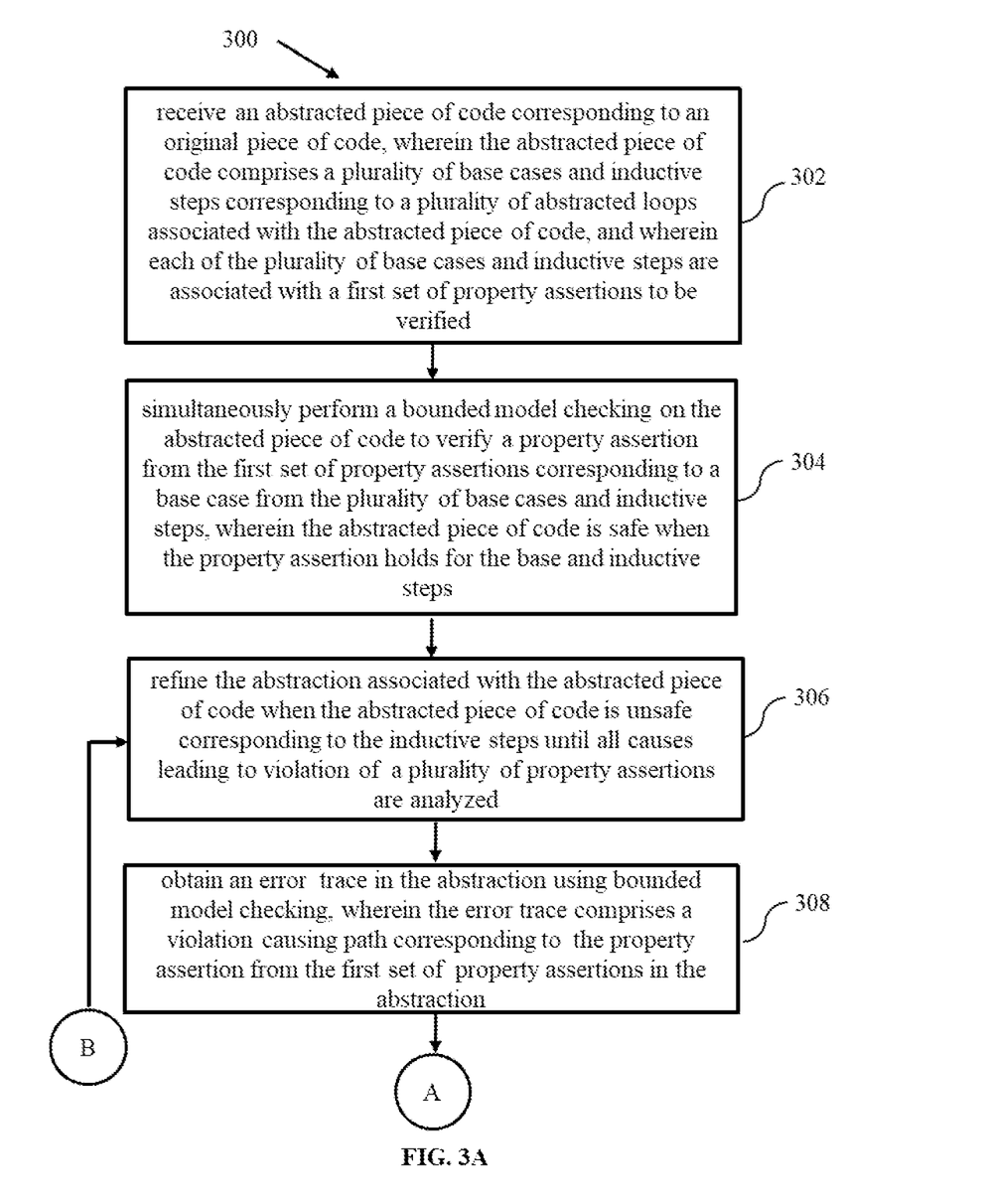
FIGS. 3A and 3B are exemplary flow diagrams for the method for counter example guided loop abstraction refinement implemented by the system of FIG. 1, according to some embodiments of the present disclosure
Figure 3B:
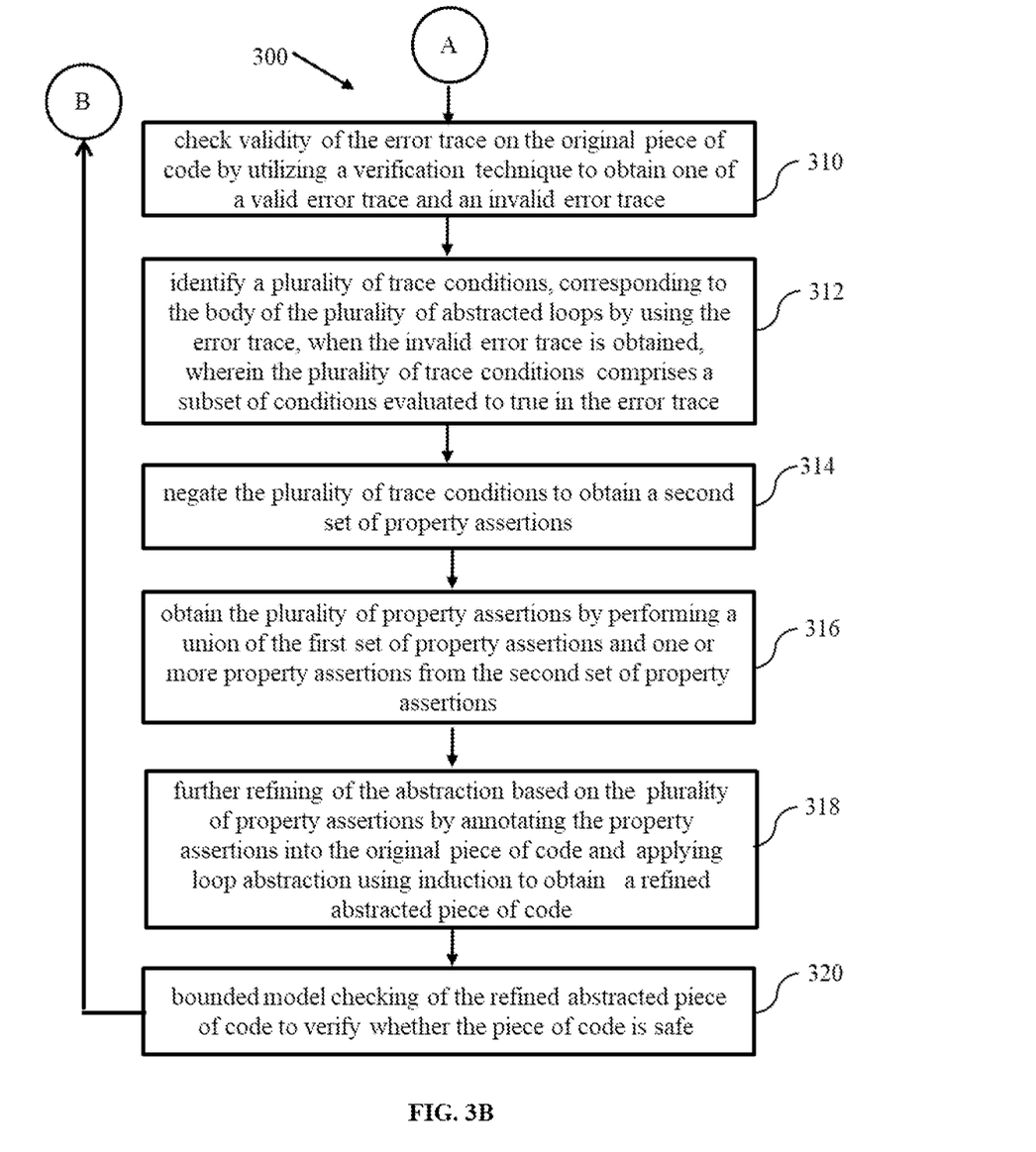

FIGS. 3A and 3B are exemplary flow diagrams for a processor implemented method for counter example guided loop abstraction refinement implemented by the system of FIG. 1, according to some embodiments of the present disclosure. In an embodiment, the system 100 comprises one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 3A through FIG. 3B. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At 302 of the method 300, the one or more hardware processors (102) receives the abstracted piece of code corresponding to the original piece of code, wherein the abstracted piece of code comprises the plurality of base cases and inductive steps corresponding to the plurality of abstracted loops associated with the abstracted piece of code, and wherein each of the plurality of base cases and inductive steps are associated with a first set of property assertions to be verified.

At 304 of the method 300, the one or more hardware processors (102) simultaneously performs the BMC on the abstracted piece of code to verify the property assertion from the first set of property assertions corresponding to the base case from the plurality of base cases and inductive steps, wherein the abstracted piece of code is safe when the property assertion holds for the base case and inductive steps At 306 of the method 300, the one or more hardware processors (102) refines the abstraction associated with the abstracted piece of code when the abstracted piece of code is unsafe corresponding to the inductive steps until all causes leading to violation of a plurality of property assertions are analyzed. The steps for refining includes: (i) obtaining an error trace in the abstraction using bounded model checking, wherein the error trace comprises a violation causing path corresponding to the property assertion from the first set of property assertions in the abstraction (ii) checking validity of the error trace on the original piece of code by utilizing a verification technique to obtain one of a valid error trace and an invalid error trace. The verification technique comprises one of a testing technique and a verification technique (iii) identifying a plurality of trace conditions, corresponding to the body of the plurality of abstracted loops by using the error trace, when the invalid error trace is obtained, wherein the plurality of trace conditions comprises a subset of conditions evaluated to true in the error trace (iv) negating the plurality of trace conditions to obtain a second set of property assertions and (v) obtaining the plurality of property assertions by performing a union of the first set of property assertions and one or more property assertions from the second set of property assertions (vi) further refining of the abstraction based on the plurality of property assertions by annotating the property assertions into the original piece of code and applying loop abstraction using induction technique to obtain a refined abstracted piece of code. The induction technique is applied for verification when at least one of property assertion from the first set of property assertion to be verified lies inside the body of each of the plurality of abstracted loops. The induction technique unrolls the abstracted loops k+1 times before slicing, wherein k may be increased with every refinement to perform k induction and (vii) bounded model checking of the refined abstracted piece of code to check whether the piece of code is safe.

In an embodiment, the system 100 is experimented as follows: The system 100 has been analyzed by using 362 benchmarks and were verified successfully within 15 minutes per input program. An example experimentation is illustrated by using example code 7 through example code 12. Here example code 7 illustrates an original code with the property assertion to be verified present inside the loop.

```
                    Example code 7
    1.      int a = 1;
    2.      int b = 2;
    3.      int d = 2;
    4.      void main( ){
    5.          while(1){
    6.              if(d == 3) d = 1;
    7.              if(a < 0) b = 3;
    8.              if(b==0 && d!=1) d = 3;
    9.              else b=0;
    10.             __CPROVER__assert(d != 1, "D");
    11.         }
    12.     }
```

```
                    Example code 8
    1.      int a = 1;
    2.      int b = 2;
    3.      int d = 2;
    4.      void main( ){
    5.          if(1){
    6.              if(d == 3) d = 1;
    7.              if(a < 0) b = 3;
    8.              if(b==0 && d!=1) d = 3;
    9.              else b=0;
    10.             assert(d != 1);
    11.         }
    12.     }
```

In an embodiment, example code 8 illustrates a base case corresponding to the original code given in the example code 7, which checks if the assertion holds with the initial values of the variables (namely, 'a', 'b', 'd'). If the assertion fails in the base case, then the program is proved to be unsafe with respect to the given property. On the other hand, if the assertion holds in the base case, the loop is abstracted and variables which are modified in the loop are assigned non-deterministic values (over-approximation) (Lines 5-7 of example code 9). As an induction hypothesis, it is assumed that the input property holds for an arbitrary number of iterations of the loop (Lines 5-14 in the example code 9). The example code 9 illustrates an inductive step of the abstraction associated with the base case of the abstracted piece of code given in the example code 8 for the original piece of code given in the example code 7. After one more iteration of the loop, it is checked if the input property still holds (Lines 16-20 in the example code 9). The final inductive step in the example code 9 includes the inductive step of the loop formed by the union of the backward slices of the input property assumption and the input property assertions in the loop unrolled twice (statement at line 19 in the example code 9 is sliced out). If the property holds in the example code 9, by induction, it can be said that the program is safe. Otherwise, based on the counter-example trace produced by a model checker like a bounded model checker, the cause leading to violation of assertion is identified. In this case let the assignment at line 16 in the example code 9 be treated as the cause by the technique. The condition under which the cause is executed becomes the causal condition or trace condition or cause (d==3 at line 16 in the example code 9). The base case of the example code 8 is refined by unrolling the loop one more time and asserting the unreachability of the causal condition, just above the conditional statement of causal condition (in case the causal condition is within an if-else ladder, the causal unreachability assertion will be added at the beginning of the ladder) in that instance of the loop body (Line 6 in the example code 10).

```
                    Example code 9
    1.      int a = 1;
    2.      int b = 2;
    3.      int d = 2;
    4.      void main( ){
    5.          a = nondet( );
    6.          b = nondet( );
    7.          d = nondet( );
    8.
    9.          if(1){
    10.             if(d == 3) d = 1;
    11.             if(a < 0) b=3;
    12.             if(b==0 && d!=1) d = 3;
    13.             else b=0;
    14.             assume(d != 1);
    15.
    16.             if(d == 3) d = 1; //cause of d!=1 assertion failure
    17.             if(a < 0) b=3;
    18.             if(b==0 && d!=1) d = 3;
    19.             else ; //statement sliced out
    20.             assert(d != 1);
    21.         }
    22.     }
```

```
                    Example code 10
    1.      int a = 1;
    2.      int b = 2;
    3.      int d = 2;
    4.      void main( ){
    5.          if(1){
    6.              assert(d!=3);
    7.              if(d == 3) d = 1;
    8.              if(a < 0) b = 3;
    9.              if(b==0 && d!=1) d = 3;
    10.             else b=0;
    11.             assert(d!=1);(induction)
    12.
    13.             if(d == 3) d = 1;
    14.             if(a < 0) b = 3;
    15.             if(b==0 && d!=1) d = 3;
    16.             else b=0;
    17.             assert(d != 1);
    18.         }
    19.     }
```

In an embodiment, the example code 10 illustrates the base case after first refinement. The input assertion should be checked in every instance of the loop body in the base case (Lines 11 and 17 in the example code 10). If the input assertion or user property assertion (Lines 11 and 17 in the example code 10) in the base case fails, the program is proved to be unsafe with respect to the input property. If none of the assertions fail in the base case, the inductive step is refined as described below. In the inductive step, depending on the causal condition, we assume the unreachability of the causal condition, just above the conditional statement of causal condition (in case the causal condition is within an if-else ladder, the causal unreachability assumption will be added at the beginning of the ladder) in the previous iteration (Line 10 in the example code 11) along with the input property assumption (Line 15 in the example code 11).

Example code 11

```
1.   int a = 1;
2.   int b = 2;
3.   int d = 2;
4.   void main( ){
5.       a = nondet( );
6.       b = nondet( );
7.       d = nondet( );
8.
9.       if(1){
10.          assume(d!=3);
11.          if(d == 3) d = 1;
12.          if(a < 0) b=3;
13.          if(b==0 && d!=1) d = 3; // cause of d!=3 assertion failure
14.          else b=0;
15.          assume(d != 1);
16.
17.          assert(d!=3);
18.          if(d == 3) d = 1; //cause 1
19.          if(a < 0) b=3;
20.          if(b==0 && d!=1) d = 3;
21.          else ; //statement sliced out
22.          assert(d != 1);
23.      }
24.  }
```

In an embodiment the example code 11 illustrates inductive step after first refinement. The unreachability of the causal condition or the trace condition is asserted just above the conditional statement of causal condition (in case the causal condition is within an if-else ladder, the causal unreachability assertion will be added at the beginning of the ladder) (Line 17 in the example code 11) and induction is applied to it. The final inductive step in the example code 11 includes an unrolled loop formed by the union of the backward slices of the causal unreachability assumption, input property assumption, causal unreachability assertion and input property assertion in the unrolled loop (statement at line 21 in the example code 11 is sliced out).

This refinement continues until no further causes for violation of assertions are identified and the program is proved to be safe by the model checker, or if the user assertion fails in a base case check and the program is shown to be unsafe. In case of the example code 11 line 13 becomes the causal condition and the base case is further refined as described in example code 12. In the example code 12, the input assertion fails and hence the original program in example code 12 is proved to be unsafe with respect to the given input property.

Example code 12

```
1.       int a = 1;
2.       int b = 2;
3.       int d = 2;
4.       void main( ){
5.           if(1){
6.               if(d == 3) d = 1;
7.               if(a < 0) b = 3;
8.               assert(!(b==0 && d!=1));
9.               if(b==0 && d!=1) d = 3;
10              else b=0;
11              assert(d!=1);
12
13              assert(d!=3);
14              if(d == 3) d = 1;
15              if(a < 0) b = 3;
16              if(b==0 && d!=1) d = 3;
17              else b=0;
18              assert(d!=1);
19
20              if(d == 3) d = 1;
```

-continued

Example code 12

```
21              if(a < 0) b = 3;
22              if(b==0 && d!=1) d = 3;
23              else b=0;
24              assert(d != 1);
25          }
26      }
```

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of identifying and representing the causal path leading to the failure of the property in the abstraction. The time complexity is less for the present disclosure. Even if a property assertion lies outside the loop body, the refinement method can apply induction to the abstract loop corresponding to the newly identified predicates or trace conditions. Furthermore, as opposed to plain k-induction, the refined abstraction of the present disclosure includes piece of code which may be less than k+1 instances of the loop body, so model checkers can scale better on it. Furthermore, as opposed to plain k-induction, the refined abstraction of the present disclosure includes more properties than those provided by the user, which can improve the precision of the (loop) abstraction and lead to the successful verification of the user provided property.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, the method comprising:
   receiving, by one or more hardware processors, an abstracted piece of code corresponding to an original piece of code, wherein the abstracted piece of code comprises a plurality of base cases and inductive steps, wherein the inductive steps corresponds to a plurality of abstracted loops associated with the abstracted piece of code, wherein each of the plurality of base cases and inductive steps are associated with a first set of property assertions to be verified, wherein the inductive steps of an abstracted loop is represented as a Control Flow Graph (CFG), wherein the CFG comprises nodes and edges, and wherein the edges represents conditions associated with the abstracted piece of code and the nodes represents corresponding actions;
   simultaneously performing, by the one or more hardware processors, a bounded model checking on the abstracted piece of code to verify a property assertion from the first set of property assertions corresponding to a base case from the plurality of base cases and the inductive steps, wherein the abstracted piece of code is safe when the property assertion holds for the base case and inductive steps;
   refining, by the one or more hardware processors, the abstracted piece of code when the abstracted piece of code is unsafe corresponding to the inductive steps until all causes leading to violation of a plurality of property assertions are analyzed, comprising:
      obtaining an error trace in the abstraction using the bounded model checking, wherein the error trace comprises a violation causing path corresponding to the property assertion from the first set of property assertions in the abstraction;
      checking validity of the error trace on the original piece of code by utilizing a verification technique to obtain one of a valid error trace and an invalid error trace;
      identifying a plurality of trace conditions, corresponding to the body of the plurality of abstracted loops by using the error trace, when the invalid error trace is obtained, wherein the plurality of trace conditions comprises a subset of conditions evaluated to true in the error trace;
      negating the plurality of trace conditions to obtain a second set of property assertions;
      obtaining the plurality of property assertions by performing a union of the first set of property assertions and one or more property assertions from the second set of property assertions;
      further refining of the abstraction based on the plurality of property assertions by annotating the plurality of property assertions into the original piece of code and applying loop abstraction using induction technique to obtain a refined abstracted piece of code; and
      bounded model checking of the refined abstracted piece of code to check whether the piece of code is safe.

2. The processor implemented method of claim 1, wherein the induction technique is applied for verification when at least one of property assertion from the first set of property assertions to be verified lies inside the body of each of the plurality of abstracted loops.

3. The processor implemented method of claim 1, wherein the induction technique unrolls the abstracted loops k+1 times before slicing, wherein k is increased with every refinement to perform k induction.

4. The processor implemented method of claim 1, wherein the verification technique comprises one of a testing technique and a plurality of verification techniques.

5. A system comprising:
   at least one memory storing programmed instructions;
   one or more Input/Output interfaces; and
   one or more hardware processors operatively coupled to the at least one memory, wherein the one or more hardware processors are configured by the programmed instructions to:
      receive an abstracted piece of code corresponding to an original piece of code, wherein the abstracted piece of code comprises a plurality of base cases and inductive steps, wherein the inductive steps corresponds to a plurality of abstracted loops associated with the abstracted piece of code, wherein each of the plurality of base cases and inductive steps are associated with a first set of property assertions to be verified, wherein the inductive steps of an abstracted loop is represented as a Control Flow Graph (CFG), wherein the CFG comprises nodes and edges, and wherein the edges represents conditions associated with the abstracted piece of code and the nodes represents corresponding actions;

simultaneously perform a bounded model checking on the abstracted piece of code to verify a property assertion from the first set of property assertions corresponding to a base case from the plurality of base cases and inductive steps, wherein the abstracted piece of code is safe when the property assertion holds for the base case and inductive steps; and refine the abstracted piece of code when the abstracted piece of code is unsafe corresponding to the inductive steps until all causes leading to violation of a plurality of property assertions are analyzed, comprising:

obtaining an error trace in the abstraction using the bounded model checking, wherein the error trace comprises a violation causing path corresponding to the property assertion from the first set of property assertions in the abstraction;

checking validity of the error trace on the original piece of code by utilizing a verification technique to obtain one of a valid error trace and an invalid error trace;

identifying a plurality of trace conditions, corresponding to the body of the plurality of abstracted loops by using the error trace, when the invalid error trace is obtained, wherein the plurality of trace conditions comprises a subset of conditions evaluated to true in the error trace;

negating the plurality of trace conditions to obtain a second set of property assertions;

obtaining the plurality of property assertions by performing a union of the first set of property assertions and one or more property assertions from the second set of property assertions;

further refining of the abstraction based on the plurality of property assertions by annotating the plurality of property assertions into the original piece of code and applying loop abstraction using induction technique to obtain a refined abstracted piece of code; and bounded model checking of the refined abstracted piece of code to check whether the piece of code is safe.

6. The system of claim 5, wherein the induction technique is applied for verification when at least one of property assertion from the first set of property assertions to be verified lies inside the body of each of the plurality of abstracted loops.

7. The system of claim 5, wherein the induction technique unrolls the abstracted loops k+1 times before slicing, wherein k is increased with every refinement to perform k induction.

8. The system of claim 5, wherein the verification technique comprises one of a testing technique and a plurality of verification techniques.

9. One or more non-transitory machine readable information storage mediums comprising one or more instructions which when executed by one or more hardware processors causes:

receiving, by one or more hardware processors, an abstracted piece of code corresponding to an original piece of code, wherein the abstracted piece of code comprises a plurality of base cases and inductive steps, wherein the inductive steps corresponds to a plurality of abstracted loops associated with the abstracted piece of code, and wherein each of the plurality of base cases and inductive steps are associated with a first set of property assertions to be verified, wherein the inductive steps of an abstracted loop is represented as a Control Flow Graph, wherein the CFG comprises nodes and edges, and wherein the edges represents conditions associated with the abstracted piece of code and the nodes represents corresponding actions;

simultaneously performing, by the one or more hardware processors, a bounded model checking on the abstracted piece of code to verify a property assertion from the first set of property assertions corresponding to a base case from the plurality of base cases and the inductive steps, wherein the abstracted piece of code is safe when the property assertion holds for the base case and inductive steps;

refining, by the one or more hardware processors, the abstracted piece of code when the abstracted piece of code is unsafe corresponding to the inductive steps until all causes leading to violation of a plurality of property assertions are analyzed, comprising:

obtaining an error trace in the abstraction using the bounded model checking, wherein the error trace comprises a violation causing path corresponding to the property assertion from the first set of property assertions in the abstraction;

checking validity of the error trace on the original piece of code by utilizing a verification technique to obtain one of a valid error trace and an invalid error trace;

identifying a plurality of trace conditions, corresponding to the body of the plurality of abstracted loops by using the error trace, when the invalid error trace is obtained, wherein the plurality of trace conditions comprises a subset of conditions evaluated to true in the error trace;

negating the plurality of trace conditions to obtain a second set of property assertions;

obtaining the plurality of property assertions by performing a union of the first set of property assertions and one or more property assertions from the second set of property assertions;

further refining of the abstraction based on the plurality of property assertions by annotating the plurality of property assertions into the original piece of code and applying loop abstraction using induction technique to obtain a refined abstracted piece of code; and bounded model checking of the refined abstracted piece of code to check whether the piece of code is safe.

* * * * *